(12) United States Patent
Zahriya et al.

(10) Patent No.: US 6,781,068 B2
(45) Date of Patent: Aug. 24, 2004

(54) DIGITAL SCALE WITH REMOVABLE TOOLS

(75) Inventors: Al Zahriya, San Mateo, CA (US); Jimmy Zahriya, San Mateo, CA (US); Waleed Zahrieh, San Mateo, CA (US)

(73) Assignee: United Supply, Inc., San Mateo, CA (US)

( * ) Notice: Subject to any disclaimer, the term of this patent is extended or adjusted under 35 U.S.C. 154(b) by 0 days.

(21) Appl. No.: 10/021,333

(22) Filed: Dec. 12, 2001

(65) Prior Publication Data

US 2002/0195281 A1 Dec. 26, 2002

Related U.S. Application Data

(60) Provisional application No. 60/255,086, filed on Dec. 12, 2000.

(51) Int. Cl.$^7$ .............................................. G01G 21/28
(52) U.S. Cl. ................... 177/127; 177/238; 177/210 C
(58) Field of Search .............................. 177/126–129, 177/131, 148, 149, 238, 244, 180, 210 C

(56) References Cited

U.S. PATENT DOCUMENTS

| | | | | |
|---|---|---|---|---|
| 379,746 A | * | 3/1888 | Watt | 177/127 |
| 634,162 A | * | 10/1899 | Bracktle | 177/127 |
| 645,091 A | * | 3/1900 | Harmon | 177/127 |
| 3,722,779 A | * | 3/1973 | Chang | 220/574 |
| 4,036,398 A | * | 7/1977 | Hoogvelt et al. | 220/270 |
| 4,846,294 A |   | 7/1989 | Sato | 177/210 C |
| 4,898,254 A | * | 2/1990 | Fukui | 177/210 C |
| 4,936,399 A | * | 6/1990 | Christman et al. | 177/210 C |
| 5,188,234 A | * | 2/1993 | Fukuda et al. | 206/541 |
| 5,443,174 A | * | 8/1995 | Bauer | 220/212 |
| 5,594,966 A | * | 1/1997 | Goldman | 7/120 |
| 5,637,838 A | * | 6/1997 | Arey et al. | 177/148 |
| 5,672,850 A |   | 9/1997 | Liu | 177/210 C |
| 5,705,212 A | * | 1/1998 | Atkinson | 426/115 |
| 6,314,600 B1 | * | 11/2001 | Cachot | 7/128 |
| 6,371,324 B1 | * | 4/2002 | Torniainen et al. | 220/212 |
| 6,412,653 B1 | * | 7/2002 | Waterhouse | 220/556 |
| 6,600,110 B1 | * | 7/2003 | Thadani et al. | 177/126 |
| 6,608,261 B2 | * | 8/2003 | Thadani | 177/126 |

\* cited by examiner

Primary Examiner—Randy W. Gibson
(74) Attorney, Agent, or Firm—Dorsey & Whitney LLP

(57) ABSTRACT

A digital scale is provided having a shell including a top cover and a bottom cover, a weight tray for receiving one or more items to be weighted and/or measured, and one or more removable tools carried on the shell. The removable tools are selected from any one of, of combination of, a spoon or tweezer.

5 Claims, 6 Drawing Sheets

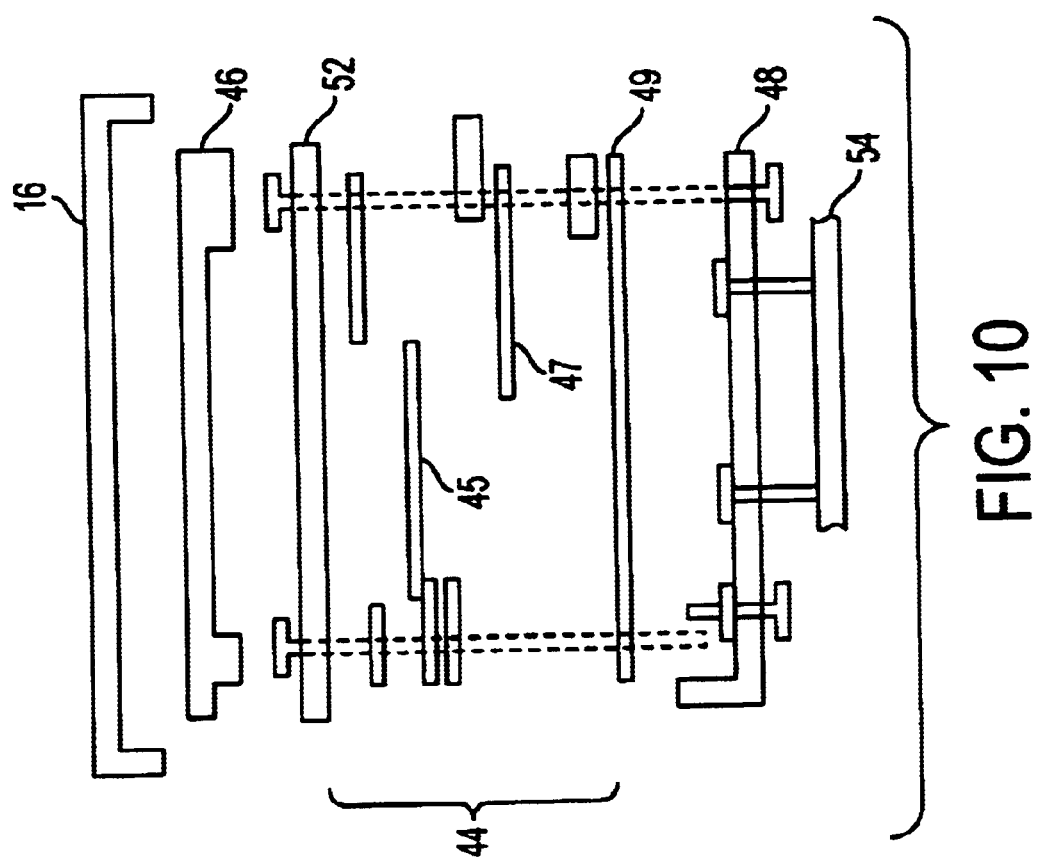

DIGITAL SCALE WITH REMOVABLE TOOLS

RELATED APPLICATIONS

This application claims the benefit of provisional patent application Ser. No. 60/255,086, filed Dec. 12, 2000, the entire disclosure of which is hereby incorporated by reference.

BRIEF DESCRIPTIONS OF THE INVENTION

This invention relates generally to digital scales and more particularly to a digital scale with one or more removable tools carried on the digital scale.

BACKGROUND OF THE INVENTION

Convenience in daily life is becoming an increasingly important part of today's society. Among users of weighing instruments such as scales, digital scales are preferred to mechanical scales due to the increase in accuracy they provide. A common implementation of a digital scale uses an electrostatic capacitance type weight sensor, particularly a Roberval mechanism. Examples of such capacitance-type scales are described in U.S. Pat. Nos. 4,846,294 and 5,672,850, the disclosures of which are hereby incorporated by reference.

One advantage of today's digital scale is precision combined with mobility. One problem associated with mobility, however, is that the prior art digital scales lack tools helpful for manipulating objects to be weighed, for example chemicals, food products, gems and the like. This limitation reduces the convenience of such mobile weighing instruments.

What is needed is a compact, precise and mobile scale that provides tools helpful to the user.

SUMMARY OF THE INVENTION

It is a general object of the present invention to provide an improved digital scale. More particularly, the present invention provides a digital scale for weighing and for measuring small items or objects, wherein the digital scale includes one or more removable tools carried on the digital scale which are useful for manipulating the objects to be weighed and/or measured.

More specifically, the present invention comprises a shell having a top cover and a bottom cover, a weight tray for receiving one or more items or objects to be weighed and/or measured, and capacitive means for weighing and/or measuring the object(s). Carried on the shell are one or more removable tools for manipulating the object(s) to be weighed. In one embodiment, the removable tools include a spoon and/or a tweezer.

BRIEF DESCRIPTION OF THE DRAWINGS

The invention will be more fully understood from the following description when read in conjunction with the accompanying drawings, wherein:

FIG. 10 is a simplified assembly cross-sectional view of one embodiment of the present invention.

DETAILED DESCRIPTION OF THE INVENTION

The present invention is now described in detail with reference to the Figures.

Figure 1A:
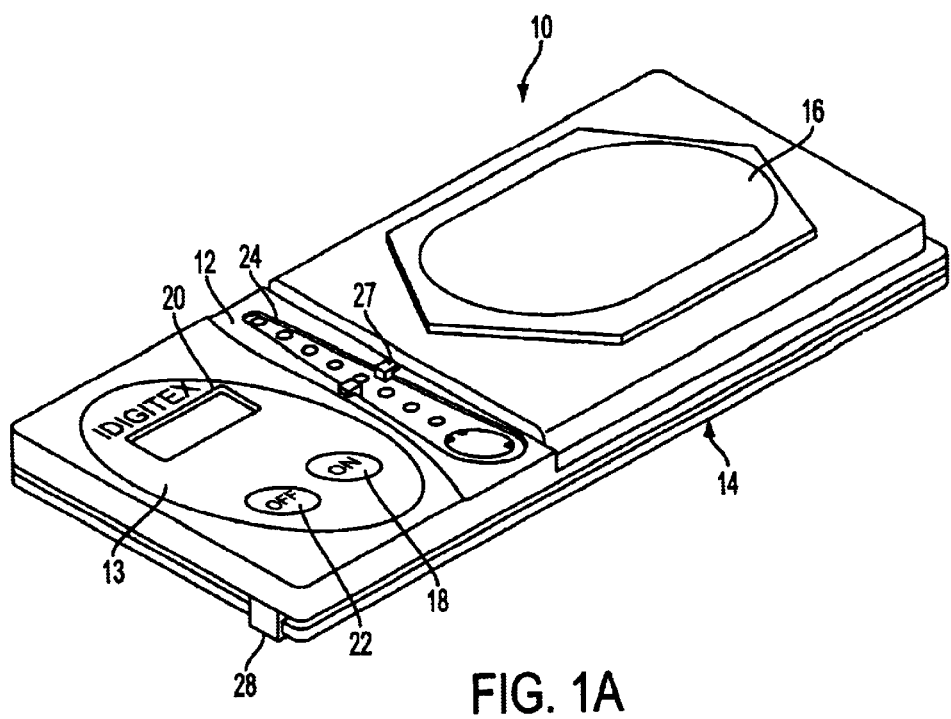
FIG. 1A is a perspective view of the digital scale of the present invention.
Figure 1B:
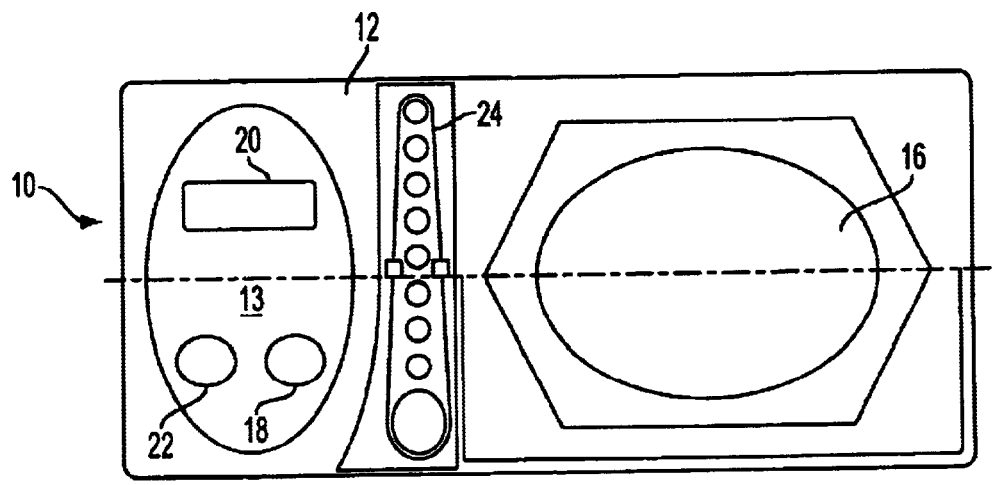
FIG. 1B is a top plan view of one embodiment of the digital scale with removable tools carried thereon in accordance with the present invention.
Figure 2:
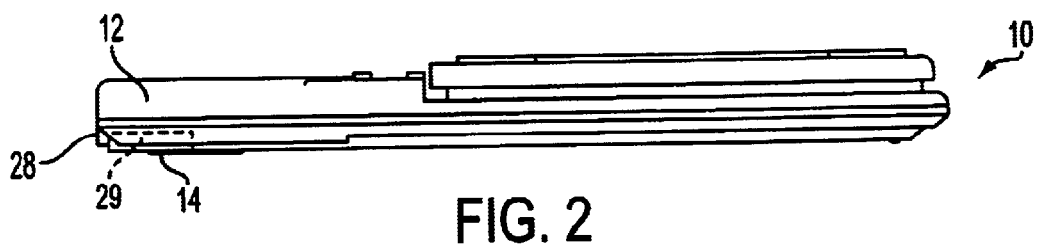
FIG. 2 is a side plan view of the scale shown in FIG. 1.
Figure 3:
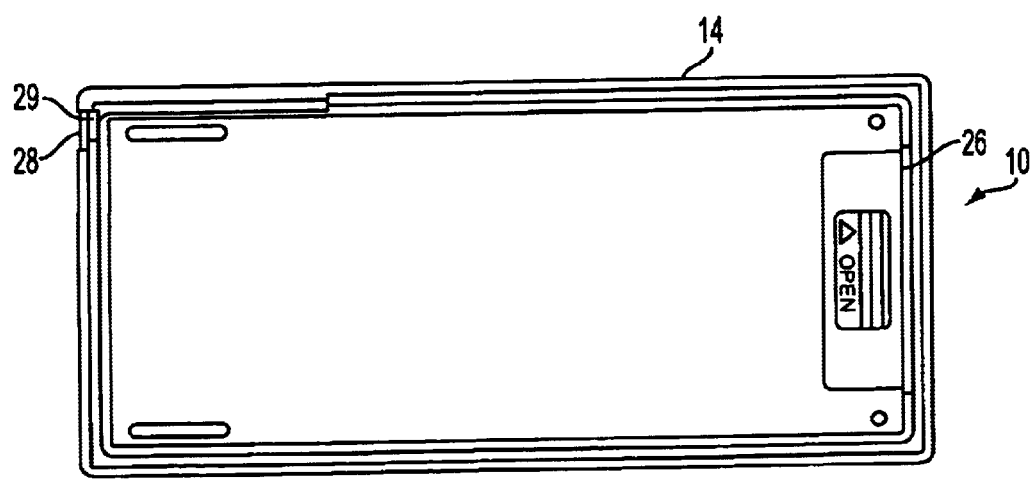
FIG. 3 is a bottom plan view of the scale shown in FIG. 1.

FIGS. 1, 2, and 3 show one embodiment of digital scale 10. Scale 10 generally includes a shell 11 having a top cover 12 and bottom cover 14 which house electronic means well known in the art. Two examples of electronic means suitable for use with the present invention include an electrostatic weight sensor and a Roberval mechanism, whereby variation in capacitance between two electrodes is used as sensed data which is converted into relative digital weight data. Weight tray 16 supports one or more items to be weighed. Items suitable for weighing with the present invention include, for example, postage, chemicals, food, precious stones and metals, and herbs.

On the top cover 12 is disposed a membrane 13 having a screen 20 which displays an LCD readout representative of the weight of the item(s) being weighed. The scale is activated and deactivated via on and off depressions 18 and 22, respectively, formed in said membrane and connected to the electronics by touch buttons which when depressed engage switches (now shown).

Of particular advantage, the present invention provides for one or more removable tools which are integrated into the scale itself Specifically, one or more tools are carried on the shell 11. The one or more tools may take any suitable form. In an exemplary embodiment of the present invention, the tools are comprised of a spoon 24 and/or a tweezer 28. The spoon 24 is carried in a complementary shaped cavity or opening 25 formed in the shell 11. In the preferred embodiment, the cavity 25 is located on the top cover 12; however, the cavity 25 can be placed at other locations, such as, for example, in the bottom cover 14. Preferably, the spoon sits substantially flush with the shell when carried in the cavity 25. Securing member 27 may be used to retain the spoon 24 in the cavity 25 when it is not in use.

In another exemplary embodiment, a tweezer 28 is provided. The tweezer 28 may also be carried in a complementary shaped cavity or opening 29 formed in the shell 11. In one exemplary embodiment, the slot 29 is located in the bottom cover 14; however, it too can be placed at other locations. In the preferred embodiment, the tweezers are carried in an opening located in the bottom cover 14 at one end. In this embodiment, the tweezers 28 are carried on the inside of the bottom cover 14, and thus only a protrusion 56 is visible. The tweezer 28 may be secured in place by securing ribs (not shown) formed on the inside of the bottom cover 14. While certain specific embodiments have been described, it should be understood by those of skill in the art that any one of the removable tools may be carried at different locations on the shell without departing from the teaching of the present invention.

Battery cover 26 secures three button-cell batteries (not shown) in scale 10. Spoon 24 is removed from scale 10 by lifting the wider end and then sliding it out of scale 10. Tweezers 28 protrude from one end of scale 10.

Figure 4:
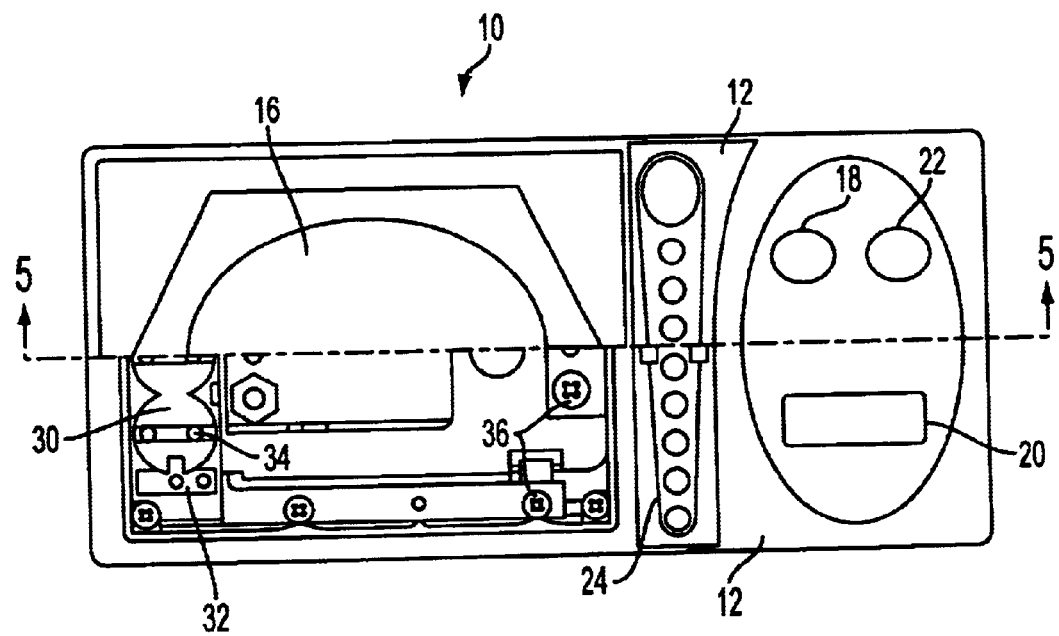
FIG. 4 is a top plan view of the scale shown in FIG. 1A with half of the cover removed to better illustrate the scale.

FIG. 4 shows scale 10 with part of top cover 12 removed. Battery compartment 30 houses the three batteries. Positive plate 32 couples to one side of the batteries while negative plate 34 couples to the other side. Screws 36 anchor various components within scale 10.

Figure 5:
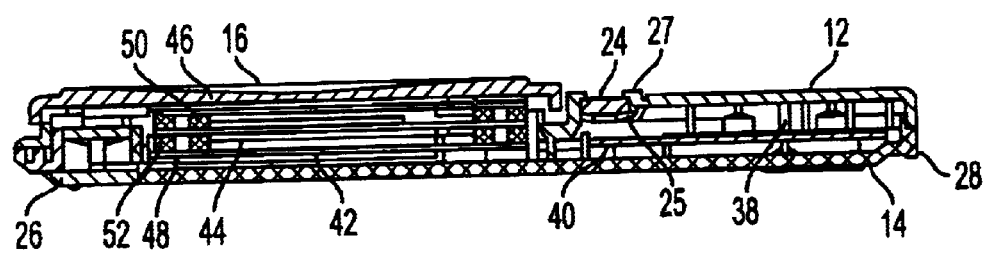
FIG. 5 is a cross sectional view of the scale in FIG. 4 taken along line 5—5.

FIG. 5 shows a cross sectional view of scale 10 along line 5—5 of FIG. 4. LCD insert 38 for screen 20 provides one method for displaying the weight. Printed circuit board 40 contains a processor or other electronic circuits for calculating a weight of an item(s) based on a capacitive-based measurement, which are well known in the art. Referring to FIGS. 10–13, one embodiment of the digital scale is shown in greater detail. The digital scale is a capacitive type scale. As described in the Background, the principles for weighing objects using capacitance are well known in the art. As shown in FIGS. 10–13, the weight tray 16 is attached to a support plate 46. The support plate is secured at one end via screws to a base plate 48. The support plate 46 "floats" that is it is movable up and down with the weight of the item(s) placed in the weight tray 16. Next is provided a fix plate 52. The fix plate is rigidly attached to the base plate 48 via fixed screws. The fixed plate 52 does not float. The base plate is mounted to a back plate 54 which is attached to the bottom cover 14. An elastic plate 49 may also be provided.

Sandwiched between the fix plate 52 and the base plate 48 is an electrode plate 44 having a stationary electrode 45 and a movable electrode 47. As an object is placed in the weight tray, the movable support plate 46 is displaced downward. The support plate 46 is coupled to the movable electrode 47 which is displaced as the support plate is displaced, thereby causing the distance between the stationary electrode 45 and the movable electrode 47 to increase. The electrodes are coupled to the printed circuit board 40, where the weight is calculated based on this displacement and then displayed on the screen 20.

While one specific capacitive measurement embodiment has been described, it should be understood by those of skill in the art that other types of capacitive measurement mechanisms known in the art may be used.

Figure 6:
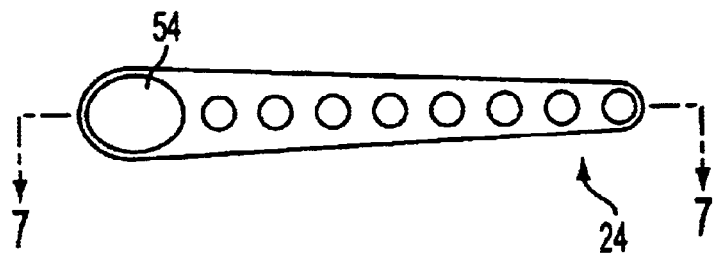
FIG. 6 is a top plan view of the spoon removed from the digital scale in accordance with one embodiment of the present invention.
Figure 7:
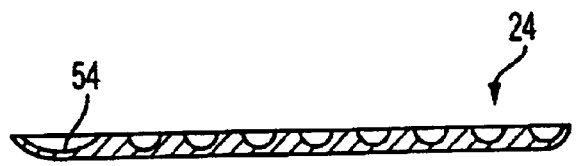
FIG. 7 is a cross sectional view of the scale shown in FIG. 5 taken along line 7—7.
Figure 8:
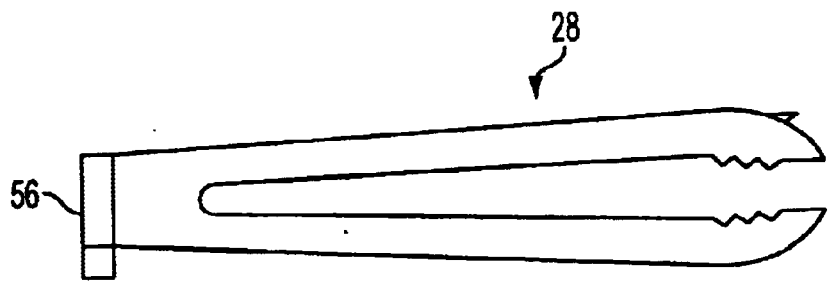
FIG. 8 is a top plan view of tweezers removed from the digital scale in accordance with one embodiment of the present invention.
Figure 9:
FIG. 9 is a side plan view of the scale shown in FIG. 7.
Figure 13:
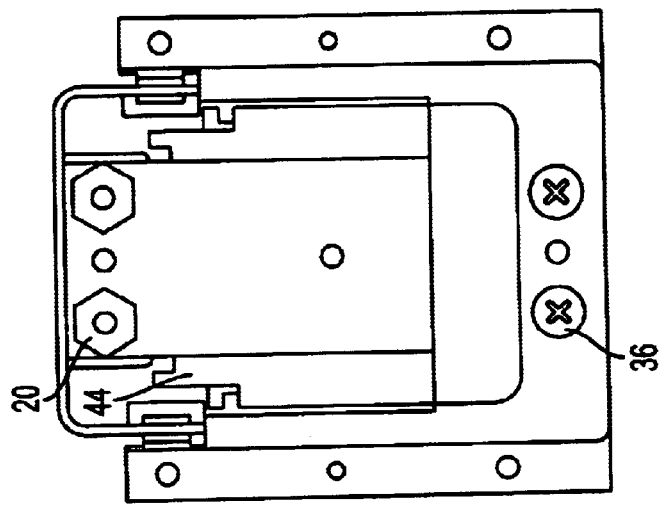
FIG. 13 is a cutaway top plan view along another section of the scale in FIG. 5.
Figure 12:
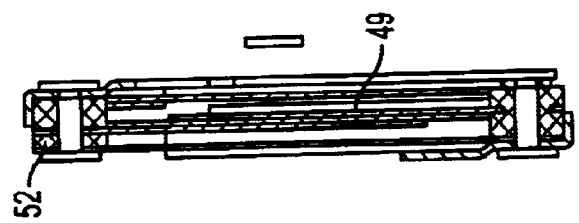
FIG. 12 is a sectional view taken along section line 12—12 of FIG. 11.
Figure 11:
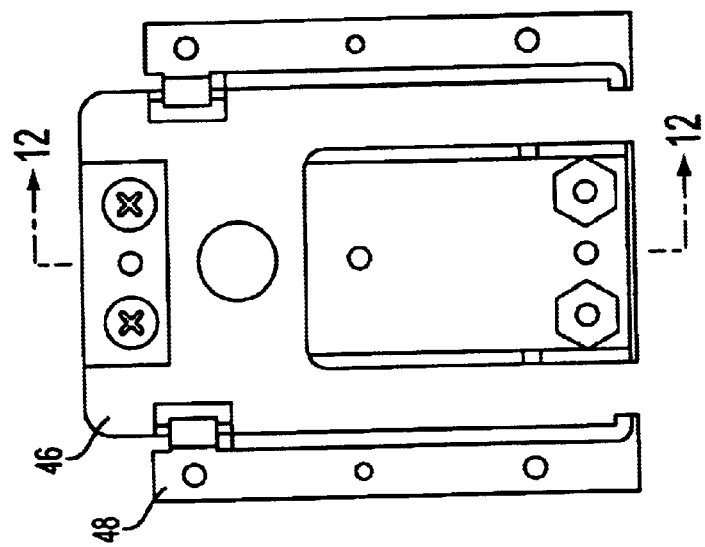
FIG. 11 is a cutaway top plan view along one section of the scale in FIG. 5.

FIGS. 6 and 7 show different views of removable spoon 24 in accordance with one embodiment of the present invention. Preferably, the spoon 24 includes one or more depressions 54 formed therein to further assist the user in measuring the item(s) to be weighed. Alternatively, the spoon may contain no depression. FIGS. 8 and 9 show different views of a removable tweezer 28 in accordance with one embodiment of the present invention. Tweezer 28 may be removed from scale 10 by pulling on protrusion 56 and sliding tweezers 28 from scale 10.

To weigh an object, it is placed on the weight tray 16. The weight of an object is more accurately reflected when it is placed in the center of weight tray 16. The ON/TARE button 18 activates scale 10. When scale 10 is activated, screen 20 displays "8.8.8.8" for about five seconds, and then displays "0.0," at which point it is ready. Weight tray 16 should be empty of objects when scale 10 is activated in order to obtain a correct reference weight. OFF button 22 deactivates scale 10.

In order to weigh an item with respect to another item, the reference item, for example removable spoon 24, is placed on weight tray 16 and then ON/TARE button 18 is pressed. Scale 10 discounts the weight of whatever is on weight tray 16 when ON/TARE button 18 is pressed, including any weight during activation. Scale 10 measures a total of approximately 100 grams and should be resting on a motionless, hard, level surface when activated and during weighing, otherwise an inaccurate reading is likely. If attempting to weigh objects beyond the range of scale 10, screen 20 displays "EE.E." Scale 10 deactivates after a period of nonuse, for example three minutes. Heavy objects should not rest on scale 10 when not in use. The reported weight should be accurate within 0.1 gram if it is 50 grams or less, and within 0.2 grams if the weight is between 50 and 100 grams. If batteries (not shown) are low on power then screen 20 displays "LO."

Scale 10 should not be exposed to strong vibration, direct sunlight, extreme temperatures, or a rapid change in ambient temperature As described by the foregoing, a versatile digital scale with removable tools which is easily transported and used is provided by the present invention.

While the invention has been described with reference to specific embodiments, it will be apparent to those of skill in the art that modifications may be made without departing from the spirit and teaching of the invention.

What is claimed is:

1. A digital scale comprising:

a shell having a top cover and a bottom cover;

a weight tray for receiving one or more items to be weighed;

capacitive means for determining the weight of said one or more items; and one or more removable tools carried on said shell, wherein said one or more removable tools are selected from any one of, or a combination of, spoon or tweezer.

2. The digital scale of claim 1 wherein said one or more removable tools is comprised of a spoon, the spoon being carried in a complementary shaped cavity formed in the top cover.

3. The digital scale of claim 1 wherein said one or more removable tools is comprised of a spoon, the spoon being carried in a complementary shaped cavity formed in the bottom cover.

4. The digital scale of claim 1 wherein said one or more removable tools is comprised of a tweezer, the tweezer being carried in a complementary shaped cavity formed in the shell.

5. The digital scale of claim 1 wherein said one or more removable tools is comprised of a tweezer, the tweezer being carried in an opening located at one end of the bottom cover.

* * * * *